(12) United States Patent
Schüler et al.

(10) Patent No.: US 8,894,143 B2
(45) Date of Patent: Nov. 25, 2014

(54) DRIVE DEVICE

(75) Inventors: Rolf Schüler, Heiligenhaus (DE); Bernd Bossmanns, Erkrath (DE)

(73) Assignee: Johnson Controls Components GmbH & Co. KG, Kaiserslautern (DE)

( * ) Notice: Subject to any disclaimer, the term of this patent is extended or adjusted under 35 U.S.C. 154(b) by 572 days.

(21) Appl. No.: 13/130,135

(22) PCT Filed: Feb. 3, 2010

(86) PCT No.: PCT/EP2010/000650
§ 371 (c)(1),
(2), (4) Date: May 19, 2011

(87) PCT Pub. No.: WO2010/091816
PCT Pub. Date: Aug. 19, 2010

(65) Prior Publication Data
US 2011/0221248 A1     Sep. 15, 2011

(30) Foreign Application Priority Data
Feb. 12, 2009   (DE) .......................... 10 2009 008 576

(51) Int. Cl.
| | |
|---|---|
| *B60N 2/427* | (2006.01) |
| *B60N 2/16* | (2006.01) |
| *B60N 2/02* | (2006.01) |
| *B60N 2/18* | (2006.01) |
| *B60N 2/44* | (2006.01) |
| *B60N 2/225* | (2006.01) |

(52) U.S. Cl.
CPC .......... *B60N 2/4435* (2013.01); *B60N 2/42709* (2013.01); *B60N 2/1615* (2013.01); *B60N 2/0232* (2013.01); *B60N 2/1867* (2013.01); *B60N 2/2252* (2013.01); *B60N 2/1655* (2013.01)
USPC ............... 297/216.19; 297/344.15; 297/216.2

(58) Field of Classification Search
CPC .......................... B60N 2/1615; B60N 2/42709
USPC ............... 297/354.12, 354.1, 216.13, 344.17, 297/344.15, 216.19, 216.2
See application file for complete search history.

(56) References Cited

U.S. PATENT DOCUMENTS 3,972,563 A * 8/1976 Gustafsson ................... 297/362
4,371,207 A * 2/1983 Wilking et al. .......... 297/344.15

(Continued)

FOREIGN PATENT DOCUMENTS

| DE | 102 25 247 A1 | 1/2004 |
| DE | 103 41 001 B3 | 3/2005 |

*Primary Examiner* — David R Dunn
*Assistant Examiner* — Richard Lowry
(74) *Attorney, Agent, or Firm* — McGlew and Tuttle, P.C.

(57) ABSTRACT

In a drive device for a vehicle seat (1), having a frame (10) which belongs to the vehicle seat (1), an output (14*a*, 14*b*) which belongs to the vehicle seat (1), is hinged to the frame (10) and is pivotable relative to the latter about an axis (A), and a geared fitting (16), the two fitting parts (16*a*, 16*b*) of which perform a relative rotational movement with superposed tumbling movement in a drive situation. One fitting part (16*a*) acts on the output (14*a*, 14*b*) and the other fitting part (16*b*) is supported on the frame (10). A transmission element (25, 35, 37) is provided between the fitting part (16*a*) which acts on the output (14*a*, 14*b*) and the output (14*a*, 14*b*). The transmission element (25, 35, 37) is torsionally rigid in the circumferential direction of the axis (A) and simultaneously flexible in the radial direction of the axis (A).

20 Claims, 4 Drawing Sheets

(56) References Cited

U.S. PATENT DOCUMENTS

| | | | |
|---|---|---|---|
| 4,439,053 A * | 3/1984 | Pelz | 403/101 |
| 4,469,375 A * | 9/1984 | Boyer | 297/362 |
| 4,629,251 A * | 12/1986 | Tezuka | 297/362 |
| 4,708,392 A * | 11/1987 | Werner et al. | 297/362 |
| 4,832,405 A * | 5/1989 | Werner et al. | 297/362 |
| 4,874,204 A * | 10/1989 | Walk | 297/362 |
| 5,553,922 A * | 9/1996 | Yamada | 297/362 |
| 5,871,414 A * | 2/1999 | Voss et al. | 475/175 |
| 7,314,250 B1 * | 1/2008 | Eblenkamp et al. | 297/362 |
| 7,455,361 B2 * | 11/2008 | Stemmer et al. | 297/362 |
| 7,458,639 B2 * | 12/2008 | Thiel et al. | 297/367 R |
| 7,513,573 B2 * | 4/2009 | Wahls et al. | 297/362 |
| 7,520,568 B2 * | 4/2009 | Hoshihara et al. | 297/367 R |
| 7,571,962 B2 * | 8/2009 | Thiel et al. | 297/367 R |
| 7,673,943 B2 * | 3/2010 | Ohta et al. | 297/362.11 |
| 2011/0121629 A1 * | 5/2011 | Roth et al. | 297/354.12 |

* cited by examiner

DRIVE DEVICE

CROSS REFERENCE TO RELATED APPLICATIONS

This application is a U.S. National Phase application of International Application PCT/EP2010/000650 and claims the benefit of priority under 35 U.S.C. §119 of German Patent Application DE 10 2009 008 576.9 filed Feb. 12, 2009, the entire contents of which are incorporated herein by reference.

FIELD OF THE INVENTION

The invention relates to a drive device for a vehicle seat with a frame associated with the vehicle seat and including an output associated with the vehicle seat, which is articulated to the frame and may be pivoted relative thereto about an axis, and a geared fitting, the two fitting parts thereof being in a drive situation, performing a relative rotational movement with a superimposed wobble motion, one fitting part acting on the output and the other fitting part being supported on the frame.

BACKGROUND OF THE INVENTION

Irrespective of the use of the drive device, the component which is at rest relative to the force introduction is denoted as the frame and the component which is pivotable thereto is denoted as the output.

In vehicle seats, it is known to use four arm kinematic systems as height adjusters, in which the rear upper joint is locked due to the moment load which is generally smallest at that point and for reasons of constructional space. Generally, this is carried out by locking modules which have little clearance or are free of clearance or load-bearing gear motors which are mounted on the frame and which act via a pinion on teeth on the rear rocker (=output), whereby ultimately free clearances or elastic clearances are again produced in the kinematic system. As the wobble geared fittings developed for adjusting the backrest are, in principle, free of clearance and are able to tolerate the required operating and crash loads in the upper rear point of articulation of conventional height adjuster-kinematic systems, it has already been proposed to produce a drive device in which such a geared fitting, as a load bearing joint which is free of clearance, is associated with the rear rocker and/or its upper point of articulation, the rocker itself or an intermediate lever being fixedly connected to the wobble fitting part and being used as a force transmitting element. One solution is disclosed in DE 102 25 247 A1, according to which a geared fitting may be incorporated in the kinematic system as a drive device by means of a lever and slot-pin guide.

One solution disclosed in DE 103 41 001 A1, which serves for reducing the kinematically produced non-uniformity due to the wobble motion of the geared fitting, is the use of an intermediate gear with a gear ratio which is non-uniform over one revolution, in order to increase the input speed of the geared fitting in phases with the kinematically produced low output speed of the drive device, although the actual drive (electric motor or step-by-step mechanism) operates at the same speed.

The immediate consequence of any construction with a direct connection of a wobble fitting part to a kinematic system by means of a lever is, however, a non-uniform speed of movement and direction of movement at the point of articulation of the lever, as the effective operating length of this lever as well as the point of force introduction are significantly altered, when observed over one revolution. During conventional backrest use, the lever (namely the backrest) typically with a length of 600 mm is markedly longer than the alteration to the lever length during rotation (the engagement radius of the teeth in the geared fitting of approximately ±30 mm corresponds to an alteration of 600 mm/±30 mm=±5%), in height adjuster-kinematics with typical lever lengths of approximately 100 mm the same amount of alteration of the lever length has a significant influence (100 mm/±30 mm=approximately ±30%). Even if, by careful choice of the kinematic points of articulation, this significant alteration to the force ratio and speed ratio may be reduced (approximately halved) in its effect, a 15% alteration to the speed ratio or force ratio within a kinematic system is disadvantageous as regards uniform adjustments.

SUMMARY OF THE INVENTION

The object of the invention is to improve a drive device of the aforementioned type with regard to alterations to the speed ratio or force ratio. This object is achieved according to the invention by a drive device comprising a frame associated with the vehicle seat and an output associated with the vehicle seat, the output being articulated to the frame and being pivotable relative thereto about an axis. A geared fitting with two fitting parts thereof is provided such that in a drive situation the geared fitting performs a relative rotational movement with a superimposed wobble motion. One of the fitting parts acts on the output and the other fitting part is supported on the frame. A transmission element is provided between the fitting part acting on the output and the output. The transmission element is torsionally rigid in the circumferential direction of the axis and simultaneously flexible in the radial direction of the axis.

By means of the drive device according to the invention, the uniform rotational movement of the geared fitting which is present is used for a uniform movement of the output relative to the frame, whilst the superimposed wobble motion is filtered out, so that it is not transmitted to the output. To this end, the transmission element according to the invention provided between the output and fitting part is torsionally rigid in the circumferential direction of the axis of the output, so that the rotational motion is transmitted directly along the transmission element, and simultaneously is flexible in the radial direction of the axis, so that the wobble motion bends the transmission element to and fro in the radial direction without it being transmitted onwards.

When used for a vehicle seat, the drive device according to the invention may be provided on one side (combined with a simple joint) or on both sides, in the latter case a synchronization being required, which may be carried out mechanically or electrically. The drive device is, in turn, driven manually or by motor. Modular systems may be produced by means of the different embodiments and arrangements.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
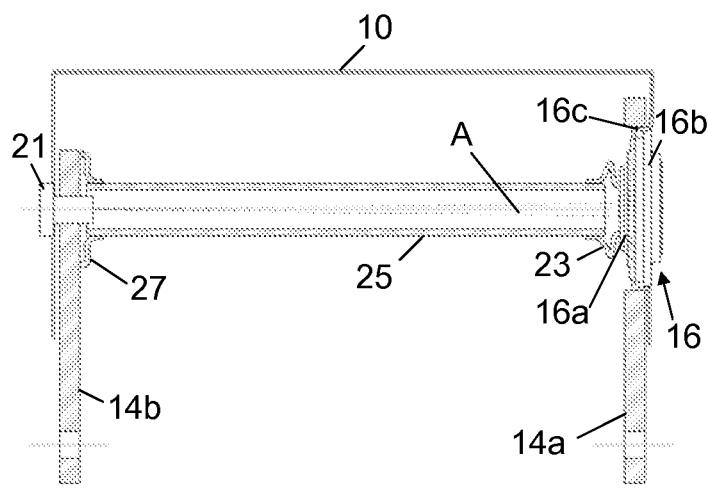
FIG. 1 is a partially schematic and partially sectional view of the first exemplary embodiment according to the invention.

Referring to the drawings in particular, a vehicle seat 1 for a motor vehicle is fastened with its subframe 3, for example two seat rail pairs, to the vehicle floor of the motor vehicle. The vehicle seat 1 has a height adjuster 5, by means of which the height of the seat cushion 8 of the vehicle seat 1 may be adjusted above the vehicle floor (and thus above the subframe 3). The height adjuster 5 comprises a seat frame 10 which carries the seat cushion 8 and on both vehicle seat sides one respective front rocker 12 and one respective rear rocker 14a, 14b, each of which being articulated at their upper end to the seat frame 10 and at their lower end to the subframe 3. Thus on each vehicle seat side the rockers which are present at that point, the subframe 3, and the seat frame 10 form the four gear members of a four bar linkage.

The two vehicle seat sides have substantially the same configuration. One of the two vehicle seat sides is denoted as the first vehicle seat side and the rear rocker at that point as the first rocker 14a. Accordingly, the other vehicle seat side is denoted as the second vehicle seat side and the rear rocker at that point as the second rocker 14b. The points of articulation aligned with one another between the seat frame 10 and the two rear rockers 14a, 14b define an axis A to which a subsequently-used cylindrical coordinate system refers. At least on the first vehicle seat side a geared fitting 16 is provided at the point of articulation between the first rocker 14a and the seat frame 10, as a result of which a drive device is defined. The seat frame 10 serves as the frame, and one of the two rear rockers 14a, 14b as the output. The geared fitting 16 serves both for driving the height adjuster 5 and for locking said height adjuster.

The geared fitting 16 is a self-locking eccentric epicyclic gear, the two fitting parts 16a, 16b thereof performing a relative rotational movement (about the axis A) with a superimposed wobble motion (in a plane perpendicular to the axis A). The internal construction of the geared fitting 16 is, for example, disclosed in DE 44 36 101 A1 or in DE 101 44 840 A1, the disclosure thereof being expressly included in the invention (U.S. Pat. No. 5,634,689, corresponding to DE 44 36 101 A1, is incorporated herein by reference in its entirety). The geared fitting 16 may be driven manually or by motor, a rotating drive shaft, which is preferably aligned with the axis A, driving the eccentric by means of a drive element.

In terms of construction, the geared fitting 16 is disk-shaped as is disclosed, for example, in DE 101 05 282 A1, the disclosure thereof relative thereto being expressly included in the invention (corresponding U.S. Pat. No. 6,799,806 is incorporated herein by reference in its entirety). Thus the geared fitting 16 is arranged on the axis A, and radially outwardly has a clamping ring 16c which encompasses at least one fitting part 16a and preferably is fixedly connected to the other fitting part 16b. The disk shape permits the structural integration of the geared fitting 16 in the point of articulation between the first rocker 14a and the seat frame 10, preferably by the clamping ring 16c acting as a bearing pin (with a large diameter). A fitting part 16a is at least indirectly operatively connected to the first rocker 14a. In the present case, the other fitting part 16b is supported on the seat frame 10 (i.e. is carried by the seat frame 10) and is fastened preferably directly or by means of the clamping ring 16c to said seat frame. If the geared fitting 16 is driven, the two rear rockers 14a, 14b pivot relative to the seat frame 10, at the latest when the drive motion is transmitted into the entire kinematic system of the height adjuster 5, due to the rigidity of the seat frame 10. Thus the two four bar linkages are driven and the height of the seat cushion 8 is adjusted.

In this regard, the exemplary embodiments described in more detail are the same.

In the first exemplary embodiment (FIG. 1) the seat frame 10 carries on the second vehicle seat side (i.e. opposing the geared fitting 16) a bearing pin 21, on which the second rocker 14b is pivotably mounted. The fitting part 16b fastened to the seat frame 10 is aligned with the bearing pin 21. In a drive situation, the fitting part 16a facing the second vehicle seat side performs, in addition to the relative rotational movement, the superimposed wobble motion which is indicated in FIG. 1 by the center lines adjacent to the axis A. This fitting part 16a is connected by means of a first membrane 23 which is torsionally rigid (in the circumferential direction of the axis A) and simultaneously flexible (in the radial direction of the axis A), to a rigid transmission tube 25, which by means of a second membrane 27 which is also torsionally rigid (in the circumferential direction of the axis A) and simultaneously flexible (in the radial direction of the axis A), is connected fixedly in terms of rotation to the second rocker 14b.

As a result of this arrangement, in which the mounting of the second rocker 14b only permits a purely rotational movement and the membranes 23, 27 in each case permit an angular offset of the rotational axis of the transmission tube 25 relative to the axis A, the wobble motion, present in its entirety on the first vehicle seat side, of the fitting part 16a and of the end at that point of the transmission tube 25 toward the second vehicle seat side becomes continuously smaller, in order that it is ultimately equal to zero in the bearing arrangement of the second rocker 14b, so that only the purely rotational movement is transmitted. The rotational axis of the transmission tube 25 runs on a conical surface about the axis A. The pure and uniform drive movement produced on the second vehicle seat side for the height adjuster 5 is transmitted in this first exemplary embodiment via the rigidity of the seat frame 10 into the entire kinematic system of the height adjuster 5. The use of a further transverse connection at almost any point between the rockers 14a, 14b may further increase the overall rigidity.

Figure 2:
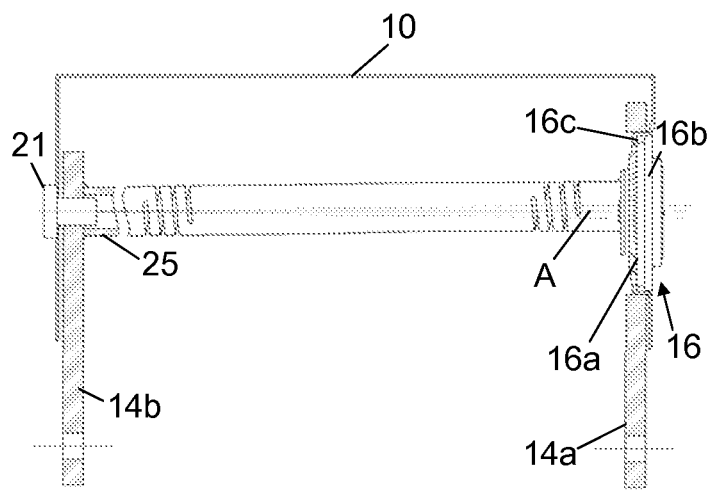
FIG. 2 is a partially schematic and partially sectional view of the second exemplary embodiment according to the invention.

In a second exemplary embodiment (FIG. 2) the function of the membranes 23 and 27 present on both sides is integrated in the transmission tube 25, which has regions which are torsionally rigid (in the circumferential direction of the axis A) and flexible (in the radial direction of the axis A). This reduces the number of components. As may be seen in FIG. 2, in this second embodiment the transmission tube 25, preferably spring-tempered in the end regions, is partially slotted in a spiral shape in each case, whereby in these regions it is flexible but remains torsionally rigid and thus may compensate for the wobble motion, in spite of the fixed connection of the tube ends to the fitting part 16*a* and the second rocker 14*b*.

The hitherto shown solutions require in at least one region of the entire kinematic system of the height adjuster 5, preferably in the region between the rear upper points of articulation, a relatively solid transmission tube 25 as regards the driving loads and crash loads to be transmitted, which markedly restricts the constructional space and the possible choice of position of the kinematic-points of articulation, as a minimum spacing from such rigid and fixed, generally metal, components always has to be provided for the seated occupant for reasons of comfort and safety.

Figure 3:
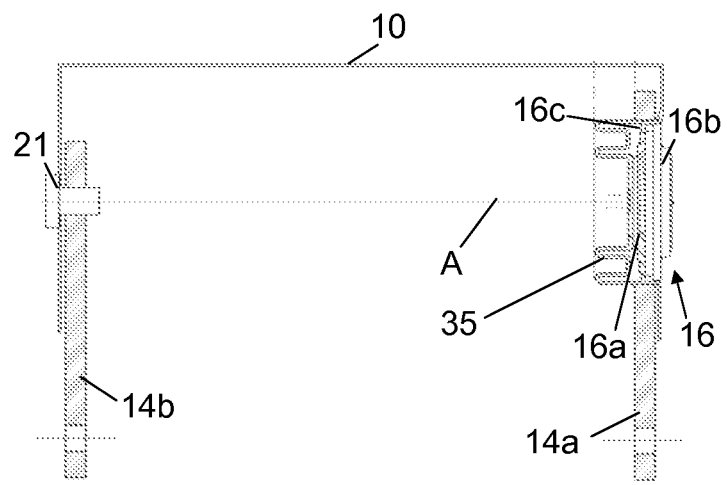
FIG. 3 is a partially schematic and partially sectional view of the third exemplary embodiment according to the invention.

For a third exemplary embodiment (FIG. 3), therefore, the transmission tube 25 is conceivably separated into a plurality of individual tubular pieces, the tubular pieces being provided with a different diameter, inserted into one another, and joined together again by means of washers to form one component. The result of this process is a metal bellows 35, which is torsionally rigid (in the circumferential direction of the axis A) as in the initial construction and the simultaneously flexible (in the radial direction of the axis A). The beads of the bellows 35 visible in FIG. 3, are arranged rotationally symmetrically and concentrically to one another before mounting. The bellows 35 introduces the wobble-free rotating movement directly on the same (first) vehicle seat side into the (first) rocker 14*a* there. The bellows 35, which is preferably produced in one piece by shaping, is fastened with its radial inner end to the fitting part 16*a* and with its radial outer end to the first rocker 14*a*, where it may additionally be used in a modification as a bearing bush. The bellows 35 only requires a disk-shaped constructional space in the immediate vicinity of the geared fitting 16.

Figure 4:
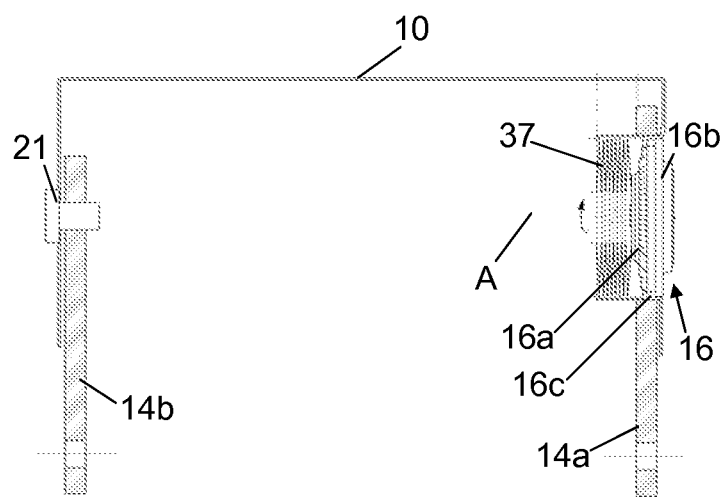
FIG. 4 is a partially schematic and partially sectional view of the fourth exemplary embodiment according to the invention.

FIG. 4 shows a fourth exemplary embodiment, in which instead of the bellows 35 of the third exemplary embodiment a membrane compensator 37 is provided. The membrane compensator 37 is a series of membranes arranged in succession in the axial direction of the axis A, in which each membrane, ultimately acting as a disk spring, adopts a partial region of the total angle to be compensated over the width of the unit. The membrane compensator 37 is fastened with its axial inner end to the fitting part 16*a* and with its axial outer end by means of a cup-shaped portion to the first rocker 14*a*.

Provided they are not described differently, the exemplary embodiments numbered two to four are the same as the first exemplary embodiment, in particular relative to the bearing pin 21.

All previously shown solutions show kinematic systems of the height adjuster 5, which are driven and locked on only one vehicle seat side. In height adjusters 5 which demand a high degree of comfort, frequently the connecting points of the safety belt are not attached to the seat rails but to the seat frame 10, in order to prevent a strapped-in occupant from being restricted in freedom of movement by the applied safety belt, when raising the vehicle seat 1. In such arrangements and in the event of a crash, considerably greater forces occur within the kinematic system of the height adjuster 5, as said kinematic system has to transmit the load at the attachment points of the safety belt on both sides into the seat rail. For this reason, in several known applications, with a one-sided locking of the seat height adjuster on the other side an additional crash-active locking system, a so-called crash blocking mechanism is used, which is itself activated by the introduction of dynamic loads, and transmits the high loads past the kinematic system into the rail.

The solutions shown in FIGS. 3 and 4 for individual locking elements, may be duplicated for the height adjuster 5 described above, namely may be used on both sides, and thus permit the implementation of a height adjuster 5 which is always capable of load bearing on both sides. In this height adjuster 5, not only the construction of the crash blocking mechanism which takes account of the dynamics and is generally difficult to adapt is dispensed with, but also the structural components of the height adjuster, i.e. primarily the seat frame 10 with its side parts, the transverse connections and the rockers 12, 14*a*, 14*b* may be designed to be considerably thinner and thus to be optimal in terms of weight and cost, due to the improved and symmetrical loading.

Figure 5:
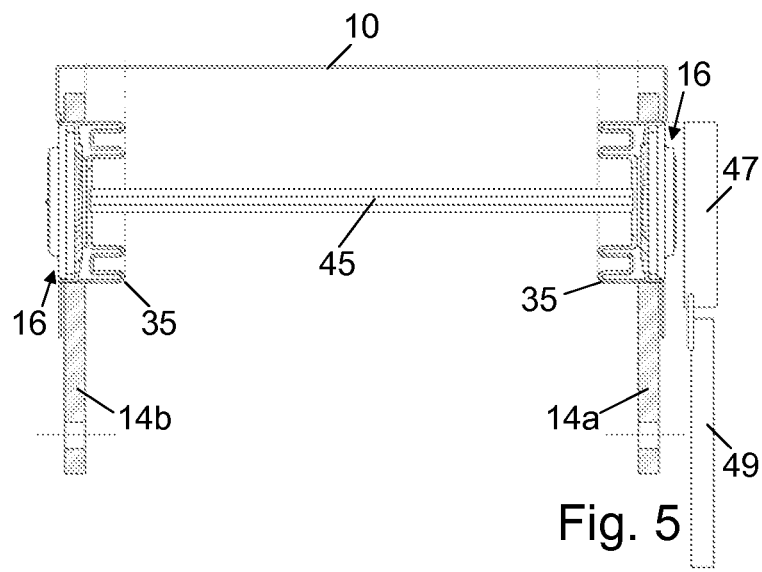
FIG. 5 is a partially schematic and partially sectional view of the fifth exemplary embodiment according to the invention.

FIG. 5 shows a fifth exemplary embodiment in which geared fittings 16 are provided on both sides. On each vehicle seat side the fitting part 16*a* performing the wobble motion is connected by means of a bellows 35 (or alternatively a membrane compensator 37) in a torsionally rigid manner (in the circumferential direction of the axis A) and simultaneously flexible manner (in the radial direction of the axis A) to the rocker 14*a*, 14*b* which is present there, as described in FIG. 3. In order to drive both geared fittings 16 synchronously, a transmission rod 45 is provided as a common drive shaft between the two vehicle seat sides. In comparison with the transmission tube 25 of the first and second exemplary embodiments, this profiled transmission rod 45 has a considerably smaller diameter and thus limits the constructional space markedly less than the stable transmission tube 25, which absorbs crash loads, of the first and second exemplary embodiments.

Apart from the geared fittings 16 attached on both sides and the transmission rod 45, a step-by-step mechanism 47 as well as the operating lever 49 required for its operation is indicated in FIG. 5. In contrast to known embodiments, the step-by-step mechanism 47 to be used here does not absorb any operating and crash loads and may thus be designed more simply, cost effectively and to be more lightweight. Different solutions for such a step-by-step mechanism 47 are known per se, the operating lever 49 thereof also being able to be moved to a different position by means of simple rods.

Figure 6:
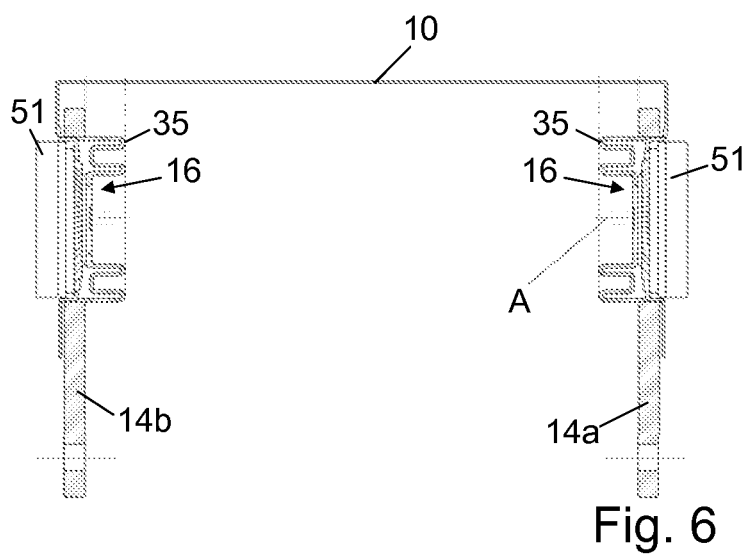
FIG. 6 is a partially schematic and partially sectional view of the sixth exemplary embodiment according to the invention.
Figure 7:
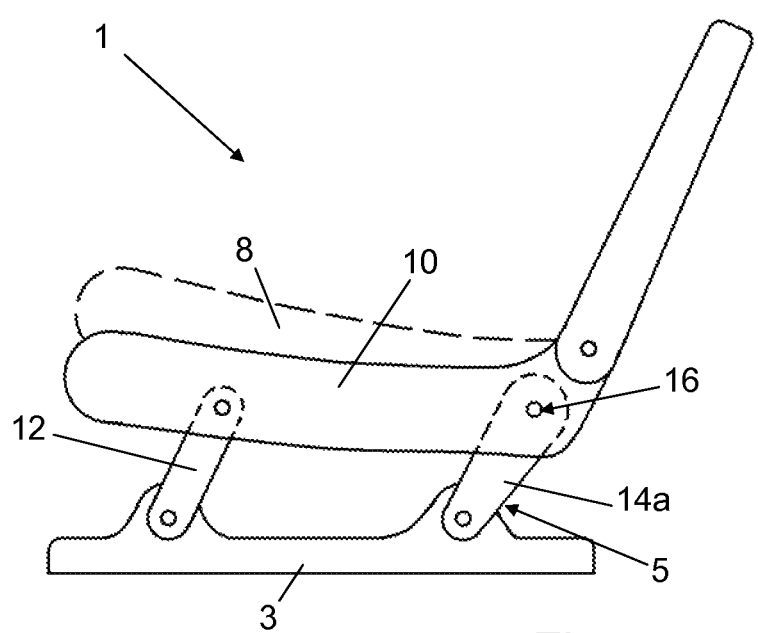
FIG. 7 is a schematic side view of the vehicle seat according to the invention.

In the case of the electrical actuation of a height adjuster 5, the arrangement of the geared fittings 16 on both sides, moreover, in turn provides the possibility of completely eliminating the thin transmission rod 45. To this end, in the sixth exemplary embodiment (FIG. 6) two separate drive motors 51 are used, optionally electrically synchronized with one another and preferably electronically commutated. FIG. 6 shows this schematically, a bellows 35 serving as the transmission element, as in FIG. 3. In this sixth exemplary embodiment, the structure of the height adjuster 5 in the transverse direction may be designed to be very flexible, as no drive motion is transmitted between the two vehicle seat sides and the load is absorbed on both sides. Thus only one of the drive motors 51 may be activated in order to incline the seat cushion 8 to the side in the vehicle and thus to increase the ease of boarding and disembarking or to adapt the lateral inclination relative to driving dynamics, i.e. to compensate for the centrifugal forces which act on the occupant during cornering.

If for constructional or other reasons, such a geared fitting 16 with a purely uniform output motion is not able to be arranged directly at one of the points of articulation of the kinematic system, naturally an arrangement at a different point is also possible and a forwarding of the output motion by means of the lever, such as for example disclosed in DE 103 41 001 A1 (see corresponding U.S. Pat. No. 7,306,285 which is incorporated herein by reference in its entirety), is possible by the interposition of a compensation element (for example the bellows 35 or membrane compensator 37).

The disclosed solutions of the third and fourth exemplary embodiments (FIGS. 3 and 4) provide the possibility of generating a group of height adjusters 5 which are modular per se, to be produced using the same structural parts, in which optionally a geared fitting 16, which compensates for the wobble motion, is used for electrically or manually active height adjusters, or even a latching fitting, such as for example disclosed in EP 1 676 502 A2 (see corresponding U.S. Pat. No. 7,648,204 which is incorporated herein by reference in its entirety), with spring support for manual, passive height adjusters 5.

Although in terms of installation and use all previously shown variants of the drive device according to the invention have referred to the height adjuster 5, the use of all the disclosed solutions is naturally also possible within areas where these fittings have been previously used, namely as backrest adjusters. This means multiple use in comparison with the present standard application, but permits a more uniform adjustment behavior for use where there are high comfort requirements, in particular with electrically driven embodiments which are acoustically sensitive. For example, the seat frame 10 serves as a frame and the backrest as an output. Finally, the use of the drive device according to the invention is also possible for an inclination adjuster, by means of which the inclination of the seat cushion 8 may be adjusted relative to the subframe 3, and which substantially differs from the height adjuster 5 only by a different kinematic system. Further possibilities of use are conceivable, for example a rotation of the vehicle seat 1.

All of the torsionally rigid and flexible transmission elements described above may be designed with regard to their elastic-plastic behavior not only so that under normal working loads, the flexible regions are used for compensating the wobble motion and the torsionally rigid regions transmit the loads as rigidly as possible, but may also be designed so that in the event of a crash i.e. with the presence of considerably greater material stresses, both or possibly even just one of the regions is subjected to a predetermined (specifically previously built-in) plastic deformation and thus absorbs kinetic energy and converts (dissipates) the energy into deformation.

While specific embodiments of the invention have been described in detail to illustrate the application of the principles of the invention, it will be understood that the invention may be embodied otherwise without departing from such principles.

The invention claimed is:

1. A drive device for a vehicle seat the drive device comprising:
    a frame associated with the vehicle seat;
    an output associated with the vehicle seat, the output being articulated to the frame and being pivotable relative thereto about an axis;
    a geared fitting with two fitting parts thereof in a drive situation, performing a relative rotational movement with a superimposed wobble motion, one of the fitting parts acting on the output and the other fitting part being supported on the frame; and
    a transmission element between the fitting part acting on the output and the output, the transmission element being torsionally rigid in the circumferential direction of the axis and simultaneously flexible in the radial direction of the axis, wherein an end of said transmission element is fastened directly to the output and another end of the transmission element is fastened directly to the fitting part acting on the output.

2. A drive device as claimed in claim 1, wherein the two fitting parts perform the relative rotational movement about the axis and the superimposed wobble motion in a plane perpendicular to the axis, wherein a force acting on said fitting part is transmitted directly to said output via said transmission element.

3. A drive device as claimed in claim 1, wherein the transmission element transmits the relative rotational movement of the two fitting parts without clearance onto the output and compensates for the wobble motion.

4. A drive device as claimed in claim 1, wherein the transmission element comprises a transmission tube fastened directly to the output by means of torsionally rigid and flexible membranes and is fastened directly to the fitting part acting on the output.

5. A drive device as claimed in claim 1, wherein the transmission element comprises a transmission tube with torsionally rigid and flexible regions, by means of which the transmission tube is fastened to the output and to the fitting part acting on the output.

6. A drive device as claimed in claim 1, wherein the transmission element comprises a bellows or a membrane compensator, which is fastened to the output and to the fitting part acting on the output.

7. A drive device as claimed in claim 1, wherein in structural terms the geared fitting is disk-shaped, by means of which it is integrated in the point of articulation between the frame and the output.

8. A drive device as claimed in claim 1, wherein the geared fitting may be driven manually by means of a step-by-step mechanism, or by a drive motor.

9. A drive device as claimed in claim 1, wherein in the event of a crash the transmission element absorbs energy in the torsionally rigid and/or flexible regions.

10. A vehicle seat comprising:
    a seat cushion with a frame;
    a subframe;
    a height adjuster, by means of which a height of the seat cushion may be adjusted via the subframe, and/or an inclination adjuster and/or a backrest adjuster, the height adjuster or inclination adjuster or backrest adjuster comprising a drive device, the drive device comprising:
    an output associated with the vehicle seat, the output being articulated to the frame and being pivotable relative thereto about an axis;
    a geared fitting with two fitting parts thereof in a drive situation, performing a relative rotational movement with a superimposed wobble motion, one of the fitting parts acting on the output and the other fitting part being supported on the frame; and
    a transmission element between the fitting part acting on the output and the output, the transmission element being torsionally rigid in the circumferential direction of the axis and simultaneously flexible in the radial direction of the axis, wherein an end of the transmission element is fastened directly to the output and another end of the transmission element is fastened directly to the fitting part acting on the output.

11. A vehicle seat as claimed in claim 10, wherein the vehicle seat has the geared fitting on just one vehicle seat side, wherein a force acting on said fitting part is transmitted directly to said output via said transmission element.

12. A vehicle seat as claimed in claim 10, wherein the vehicle seat has a geared fitting on both vehicle seat sides.

13. A vehicle seat as claimed in claim 10, wherein the two fitting parts perform the relative rotational movement about the axis and the superimposed wobble motion in a plane perpendicular to the axis.

14. A vehicle seat as claimed in claim 10, wherein the transmission element transmits the relative rotational movement of the two fitting parts without clearance onto the output and compensates for the wobble motion.

15. A vehicle seat as claimed in claim 10, wherein the transmission element comprises a transmission tube, which is fastened directly to the output by means of torsionally rigid and flexible membranes and is fastened directly to the fitting part acting on the output.

16. A vehicle seat as claimed in claim 10, wherein the transmission element comprises a transmission tube with torsionally rigid and flexible regions, by means of which the transmission tube is fastened to the output and to the fitting part acting on the output.

17. A vehicle seat as claimed in claim 10, wherein the transmission element comprises a bellows or a membrane compensator, which is fastened to the output and to the fitting part acting on the output.

18. A vehicle seat as claimed in claim 10, wherein in the event of a crash the transmission element absorbs energy in the torsionally rigid and/or flexible regions.

19. A drive device as claimed in claim 1, further comprising:
   a first membrane comprising a first membrane; and
   a second membrane, wherein said drive device has only one said gear fitting, said end of the transmission element being fastened directly and exclusively to the output via said first membrane, said another end of the transmission element being fastened directly to the fitting part acting on the output via said second membrane, wherein a force acting on said fitting part is transmitted directly to said output via said transmission element, said first membrane and said second membrane.

20. A drive device for a vehicle seat the drive device comprising:
   a frame associated with the vehicle seat;
   a first output element and a second output element associated with the vehicle seat, said first output element and said second output element being articulated to the frame and said first output element and said second output element being pivotable relative to the frame about an axis;
   a geared fitting with two fitting parts thereof in a drive situation, performing a relative rotational movement with a superimposed wobble motion, one of the two fitting parts acting on said first output element and another one of said two fitting parts being supported on the frame; and
   a transmission structure extending between said first output element and said second output element, said transmission structure being torsionally rigid in a circumferential direction of the axis and simultaneously flexible in a radial direction of the axis, wherein an end of said transmission structure is coupled exclusively with said second output element and another end of the transmission structure is directly fastened to said one of the two fitting parts acting on said output element, said transmission structure defining a force transmission path means for transmitting a force acting on said first output element directly to said second output element.

* * * * *